United States Patent [19]
Sirat et al.

[11] Patent Number: 5,394,191
[45] Date of Patent: Feb. 28, 1995

[54] METHODS FOR SYNTHESIS OF TEXTURE SIGNALS AND FOR TRANSMISSION AND/OR STORAGE OF SAID SIGNALS, AND DEVICES AND SYSTEMS FOR PERFORMING SAID METHODS

[75] Inventors: Jacques A. Sirat, Limeil Brevannes; Christophe O. Oddou, Ablon, both of France

[73] Assignee: U.S. Philips Corporation, New York, N.Y.

[21] Appl. No.: 983,021

[22] Filed: Nov. 30, 1992

[30] Foreign Application Priority Data

Dec. 4, 1991 [FR] France .................. 91 14999

[51] Int. Cl.$^6$ .................. H04N 5/14; H04N 1/41
[52] U.S. Cl. .................. 348/571; 382/28; 382/54
[58] Field of Search ............ 348/575, 576, 578, 571; 382/28, 41, 54; 395/130; H04N 1/41, 5/14

[56] References Cited

U.S. PATENT DOCUMENTS

| | | | |
|---|---|---|---|
| 4,013,828 | 3/1977 | Judice | 348/422 |
| 4,229,797 | 10/1980 | Ledley | 382/6 |
| 4,617,682 | 10/1986 | Mori et al. | 382/28 |
| 4,897,881 | 1/1990 | Ledinh et al. | 382/28 |
| 5,040,225 | 8/1991 | Gouge | 382/28 |
| 5,204,920 | 4/1993 | Moran et al. | 382/54 |

OTHER PUBLICATIONS

A. Gagalowicz, "A New Method For Texture Fields Synthesis: Some Applications To The Study Of Human Vision", IEEE Transactions on Pattern Analysis and Machine Intelligence, vol. PAMI-3, No. 5, Sep. 1981, pp. 520–533.

Y. Linde et al., "An Algorithm For Vector Quantizer Design", IEEE Transaction On Communications, vol. COM-28, No. 1, Jan. 1980, pp. 84–95.

X. Michel et al., "Unsupervised Segmentation of Texture Images", SPIE, vol. 1001, Visual Communication and Image Processing 88, pp. 582–590.

*Primary Examiner*—James J. Groody
*Assistant Examiner*—Chris Grant
*Attorney, Agent, or Firm*—Michael E. Marion

[57] ABSTRACT

Texture synthesis device and method, based on digital video signals. The synthesis device comprises a circuit (16) for computing and memorizing the structural characteristics, based on a sample referred to as reference sample, a circuit (17) for restituting an approximate synthesis picture by means of growth in a predetermined region, based on its characteristics and on the sample with a subdivision of said picture in blocks of an identical size, a circuit (18) for constituting a dictionary, based on the blocks of the sample of the same size as those of said picture and a circuit (19) for decorating said approximate synthesis picture, based on output signals of said circuit for constituting the dictionary. The invention also relates to a method of and a device for transmitting and/or storing texture signals, including the implementation of this method and this synthesis device.

20 Claims, 3 Drawing Sheets

METHODS FOR SYNTHESIS OF TEXTURE SIGNALS AND FOR TRANSMISSION AND/OR STORAGE OF SAID SIGNALS, AND DEVICES AND SYSTEMS FOR PERFORMING SAID METHODS

BACKGROUND OF THE INVENTION

The invention relates to a method of texture synthesis based on digital video signals and to a method of transmitting and/or storing texture signals providing, at the receiver end, a texture synthesis phase which comprises the steps of said synthesis method. The invention also relates to a synthesis device and to devices or systems of transmitting and/or storing texture signals for carrying out these methods.

The document "A new method for texture field synthesis: some applications to the study of human vision" by A. Gagalowicz, published in the magazine "IEEE Transactions on Pattern Analysis and Machine Intelligence", vol. PAMI-3, no. 5, Sep. 1981, pp. 520–533 describes a texture analysis method particularly taking statistical data which may be associated with texturized zones of a picture into account as analysis parameters. The textures found, for example in television pictures, which would theoretically be formed by the periodical repetition of one or several patterns, are actually not rigorous arrangements of such basic elements and the models which describe these textures rightly support this uncertain notion. Starting from these general statistical considerations, the document specifically focuses on the study, based on psychovisual considerations, of the extent to which parameters such as the statistical moments of the second order may contribute to a local discrimination of textures distinguished by the human eye.

If the synthesis of a texture in conformity with an original is to be realised, such second-order statistics can be used as relevant parameters for the visual discrimination of two textures (in this case, the original texture and the synthesized texture). Nevertheless, if the second-order statistics of a white noise picture are converged with those of the original texture, the global structure which may exist in certain regular textures (for example of the brick wall type) may be lost. The resultant picture seems to be formed as a ragged texture, like a kind of patchwork, with the individual patches being well formed but appearing to be incoherent when assembled, without any bond between them.

SUMMARY OF THE INVENTION

A first object of the invention is to provide a texture synthesis method with which the global aspect of the restituted texture is no longer handicapped by the absence of coherence.

To this end the invention relates to a method which is characterized in that it comprises the following steps:
 (a) based. on those signals which are associated with a group of pixels constituting a sample referred to as reference sample, computation and memorization of structural characteristics of said sample or of values directly associated therewith;
 (b) based on the characteristics thus computed and on the sample, restitution of an approximate synthesis picture by progressive growth in a predetermined region;
 (c) subdivision of said approximate synthesis picture into pixel blocks having an identical size;
 (d) based on the sample, constitution of a dictionary for storing blocks of the same size as those of said approximate synthesis picture;
 (e) as a function of a predetermined criterion, decoration by substituting each block of said approximate synthesis picture for a block of the dictionary for constituting a definitive synthesis picture.

To comprehend the importance of the principles thus defined, the proposed synthesis operation can be compared with the physical phenomenon of crystallization. When a crystal is being formed, a very rapid decrease of the temperature involves a start of crystallization in different places of the initial magma. These different zones of crystallization develop until they touch each other so that a rupture in the uninterrupted crystalline connection is produced at their interfaces, which is due to the fact that the links between the different zones do not exactly fit together. To improve this alignment of the links at the interfaces, the crystal may be either annealed, or reheated, with which the zones already formed can be rearranged, or, in accordance with a considerably faster method, the appearance of different points of crystallization is prevented by initially cooling the crystal at a given location and by subsequently extending the cooling around this initially formed cooled zone: the crystallization now proceeds in a progressive manner by successively bringing small quantities of the melting crystal which are left to cool into contact with the crystal already formed.

Pursuant to the analogy between crystal and texture, the assembly of texture pieces without any great coherence among them at the borders will also constitute an abnormal rupture of an interrupted connection which should not get lost. As in the case of forced crystallization which starts from an initial zone, it has been proposed to allow a similar progressive growth of the synthesis in the form of crowns successively surrounding a kind of paving or initial sample whose grey levels are known (and chosen, for example, substantially at the centre of the picture to be synthesized). The effect of "patchwork" is thus suppressed and the coherence of the synthesis picture is ensured. However, this method might appear to be too slow if a high-quality growth is to be realised and it has thus been proposed to realise a first approximate synthesis picture by means of progressive growth, occupying a predetermined region when the growth has been accomplished and, while benefiting from the fact that by way of reference one has the disposal of the starting sample constituting an original of the texture, by subsequently carrying out a kind of decoration of this first approximate synthesis picture by replacing, in accordance with a predetermined criterion, the blocks of said first picture by the most resembling blocks of the reference sample. Except for the fact that the method proposed in this application is carried out automatically with the aid of technical means, this process is somewhat analogous to the way in which an artist or painter would treat a texture sample comprising several patterns and who would be capable of restituting the whole as one coupon having a size which is as large as is desired by simply using the given patterns having a certain resolution and the arrangement with respect to these patterns. The trials realised have shown that with such a method of synthesis the picture is reconstituted rapidly and its quality is satisfactory as regards its appearance of coherence. Moreover, since the structural characteristics are no longer computed for the whole texture but only for a sample of this texture, the volume of dam to be treated is considerably reduced.

Another object of the invention is to utilize the considerable reduction of the volume of data obtained by means of the method described hereinbefore for an economical transmission of information relating to a sequence of pictures.

To this end the invention relates to a method of transmitting and/or storing texture signals, including the implementation of a texture synthesis method as described hereinbefore and is characterized in that the steps of said synthesis method in the entire predetermined region are preceded by the following steps:

(A) extraction of a sample which is representative of the texture considered;

(B) coding said sample;

(C) transmitting and/or storing coded signals thus obtained;

(D) decoding the coded signals which have been transmitted and/or stored.

The transmission and/or storage thus effected is (are) interesting because the achieved factor of data compression is important with respect to traditional coding methods where the quantity of information is proportional to the number of pixels. In the present case this information quantity is considerably smaller because it is only associated with the size of the sample.

It is another object of the invention to propose devices or systems for carrying out these methods.

To this end the invention relates to a device for texture synthesis based on digital video signals, characterized in that said device comprises:

(a) based on those signals which are associated with a group of pixels constituting a sample referred to as reference sample, a circuit for computing and memorizing structural characteristics of said sample or of values directly associated therewith;

(b) based on structural characteristics thus computed and on digital signals corresponding to said reference sample, a circuit for restituting an approximate synthesis picture by progressive growth in a predetermined region, said approximate synthesis picture being subdivided into pixel blocks having an identical size;

(c) based on blocks considered in said reference sample and having the same size as those of the approximate synthesis picture, a circuit for constituting a dictionary;

(d) based on output signals of said circuit for constituting the dictionary, a circuit for decorating said approximate synthesis picture by substituting a block of said dictionary for each approximate synthesis picture block.

Preferably, the chosen structural characteristics are the statistical moments of the second order, while the number of computed moments is fixed as a function of the desired resolution for said definitive synthesis picture, which provides the possibility of adapting this dam volume to the requirements imposed. Another manner of reducing this quantity of data is that the values of the structural characteristics are regrouped in sectors of the plane of coordinates of the motion vector which indexes the position with respect to the two pixels and by substituting said values for a unique value such as their average value.

In an advantageous embodiment of the invention the texture synthesis device is particularly characterized in that the restitution circuit comprises:

(a) a circuit for generating white noise having the histogram of the texture to be synthesized and as defined by the computing and memorizing circuit;

(b) a picture memory receiving, at a first input, said digital. signals corresponding to the reference sample and, at a second input, the output signal of said circuit for generating the white noise;

(c) a circuit for providing the address of the current pixel, said address being received by the picture memory at a third input;

(d) a circuit for successively assigning to each pixel thus chosen each one of the L possible grey level values;

(e) a circuit for computing, for each tested grey level, the statistical moments of the second order relative to the picture during synthesis in the picture memory;

(f) a circuit for computing, for each one of said L grey level values, the quadratic distance between said statistical moments relative to the picture during synthesis and the similar moments as defined for the original texture by the computing and memorizing circuit, while the smallest of the computed distances is preserved in the assigning circuit, as well as the corresponding grey value for transmission of said value to the picture memory at a fourth input of said memory.

In a perfected version of this embodiment of the synthesis device, the computing and memorizing circuit and/or the circuits for constituting the dictionary and for decoration are provided with feedback means which allow the corresponding steps of computing and memorizing the structural characteristics, and/or for constituting the dictionary and for decoration to be restarted once or several times, with blocks each time having a different :size, these block sizes being preferably first chosen among themselves.

The invention also relates to a device for transmitting and/or storing texture signals, which device comprises at least a texture synthesis device as described hereinbefore and is characterized in that it comprises, upstream of said synthesis device, a circuit for extracting the sample, a circuit for coding the signals corresponding to said extracted sample, means for transmitting and/or storing the coded signals, and a circuit for decoding the coded signals which have been transmitted and/or stored.

The invention finally relates to a system for transmitting and/or storing texture signals associated with pictures, said system comprising at least a texture synthesis device and being characterized in that it also comprises:

(1) a circuit for separating the current input picture into two sub-pictures, one comprising the texturized parts of said picture and the other comprising the non-texturized parts;

(2) a circuit for segmenting said textufized sub-picture into regions which are homogeneous in texture but which may not be connected, whose output signals are applied to said texture synthesis device;

(3) a circuit for coding the contours of said regions which are homogeneous in texture: and a circuit for coding the non-textufized sub-picture, as well as, after transmission and/or storage, a circuit for decoding said contours and a circuit for decoding the signals of the non-texturized sub-picture;

(4) a circuit for reconstructing a final picture corresponding to said current input picture from output signals of said decoding circuits and said texture synthesis device.

BRIEF DESCRIPTION OF THE DRAWINGS

These and other aspects of the invention will be apparent from and elucidated with reference to the embodiments described hereinafter. In the drawings

DETAILED DESCRIPTION OF THE PREFERRED EMBODIMENTS OF THE INVENTION

Starting from a texture sample comprising several patterns, the texture synthesis method according to the invention provides the possibility of automatically restituting a synthesis picture of this texture as large as is desired by using each pattern, given with a certain resolution, and the relative arrangement of the patterns. Assuming that the information relating to the sample is available, for example in the form of digital signals quantized at L levels (and in this non-limitative example corresponding to the luminosity of the pixels of the sample considered), this method comprises the following steps:

(a) based on said sample signals, computation and memorization of the structural characteristics of this sample (or, as will be described hereinafter, of the values associated therewith), for example of its statistical moments of the second order by only taking into account pixel pairs contained in the sample and by limiting oneself to a given number of these moments if no high resolution is aimed at and if the computations are to be limited;

(b) based on the characteristics thus computed and on said sample signals, restitution of a first approximate synthesis picture by progressive growth in a growth zone or predetermined region;

(c) subdMsion of this approximate synthesis picture into pixel blocks having an identical size;

(d) based on said sample signals, constitution of a dictionary for storing blocks of the same size as those of the approximate synthesis picture restituted in step (b);

(e) as a function of a predetermined criterion, decoration by substituting each block of this approximate synthesis picture for a block of this dictionary for constituting a definitive synthesis picture.

The study carried out in the afore-mentioned document has led to the selection of, for example, the parameters referred to as second-order statistical moments for giving a quantitative account of a texture. If a picture comprising N pixels is considered, each being associated with a grey level $X_i$ quantized at L levels of 0 to $L-1$ marked by the index i, it can be found that the statistical attributes of the first order to this picture, such as average value, standard distance, normalized histogram are insufficient to allow a discrimination between two textures: the average value only gives information about the average intensity of the picture, the standard distance only gives an indication of the dispersion of the grey levels (i.e. the global contrast of the picture), the histogram only gives an estimation of the probability of appearance of a pixel in a picture without accounting for the geometrical distribution of the pixels (this probability is not dependent on other grey levels of the neighbouring pixels in the picture).

In contrast, in a texture the presence of a grey level is firmly correlated with the grey levels of these neighbouring pixels and the second-order statistics introduce conditions which link up the probability of appearance of a grey level in a pixel with the grey level of the neighbouring pixels. The second-order moments particularly provide the possibility of discriminating between the textures because they condense the information in the second-order histograms corresponding to the different relative positions of the pairwise considered pixels.

For computing these moments, the following notations are defined:

x and y are the coordinates of the current pixel and $X_i(x,y)$ is the associated luminosity (or grey level);

$\Delta x$ and $\Delta y$ denote the components of the vector $\Delta$ materializing the difference in position between two pixels, one of which is the current pixel and the other is a pixel for comparison;

i is the index of the grey level of the current pixel, $i+\Delta$ is that of the grey level of the comparison pixel and I is the number of pixel pairs or doublets $(i, i+\Delta)$ considered in the picture (I is approximately N if the computation of the moments is carded out on the complete picture);

$I_m$ and s indicate the average value of the grey level in the computation zone of the moments (here on the picture by taking $I=N$ as has been done hereinafter) and the standard distance of the luminosity (or grey levels) of the pixels, respectively;

p and q are positive integers or zeros which define the degree of approximation of the bidimensional histogram $H\Delta(X_i, X_{i+\Delta})$, which approximation is better as p and q are higher.

The computation of the moments is carried out for a picture in accordance with formula (1) (in the following description, for the homogeneous texture region particularly considered):

$$S_{pq}(\Delta) = \frac{1}{N} \sum_{x,y} \frac{(X(x,y) - I_m)^p (X(x + \Delta_x, y + \Delta_y) - I_m)^q}{s^{p+q}} \quad (1)$$

The second-order moments could be computed for an inifinity of values, with p and q varying between 0 and infinity and $\Delta$ could also theoretically vary without any limits. In the present case, these translations $\Delta$ will be limited by causing $\Delta$ to vary, for example, by a pitch of 1 pixel in a frame of, for example $12 \times 12$ pixels, and the sum $p+q$ will be chosen as a function of a greater or smaller number of computations to be carried out. Subtraction of the average value $I_m$ and division by the standard distance s ensures a normalization of these second-order moments, i.e. it makes them independent of the luminosity and the global contrast of the considered homogeneous texture region.

To abbreviate the notations, these moments will hereinafter be referred to as $S_{pq}$. In the texture synthesis method described hereinbefore, the step (a) has allowed the computation of essential structural characteristics, here, for example the second-order statistical moments which condense the information contained in the second-order histogram corresponding to the different relative positions of the pixels in the sample.

Figure 1:
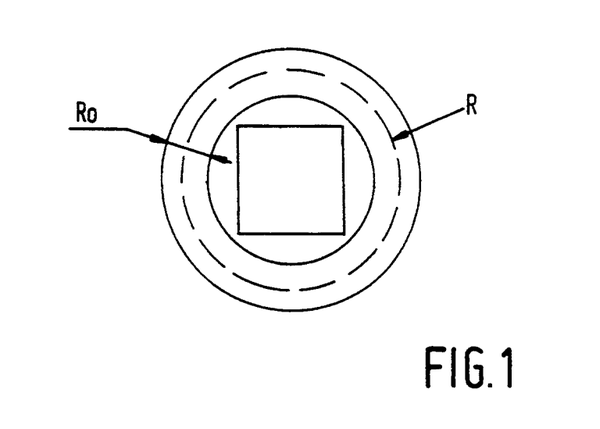
FIG. 1 shows diagrammatically an example of a growth zone of the texture synthesis picture to be obtained from a sample of said texture in conformity with the method according to the invention.

The step (b) provides the possibility of realising a first approximate synthesis of the original texture and is carried out in accordance with the following series of steps:

(1) first, the growth of the picture, starting from the sample, is initiated by pixels randomly chosen in accordance with the 1-pixel histogram;

(2) the pixels are then updated in a growth zone which is always larger around the sample (said zone is generally centred on this sample) in accordance with the following sub-steps:

(i) the growth of the size of the zone first implies a scanning of pixels in accordance with a succession which may be regular or random, for example by arbitrarily taking new pixels in accordance with a probability proportional to:

$$e^{-(\frac{((x^2+y^2)^{\frac{1}{2}}-R(t))^2}{R_0^2})} \quad (2)$$

in which expression (2) x and y are always the coordinates of the current pixel, $R_o$ is the initial thickness of the zone (in numbers of pixels, this thickness is, for example between 1 and half the side of the sample if it is a square sample) and R(t) is the mean radius of said zone, which radius increases with time, for example linearly (FIG. 1 shows diagrammatically an example of the growth zone, starting from a sample);

(ii) for each current pixel thus scanned different possible values are examined by computing each time the new values of the moments $S_{pq}$ and by choosing i0 the value which minimizes a distance criterion between the moments $S_{pq}$ of the picture during synthesis and those of the reference texture picture, for example the value which minimizes the following expression E (by scanning the sample until E effectively reaches a sufficiently small value defined by a threshold):

$$E = \sum_{p,q,\Delta} (S_{pq}^{ref}(\Delta) - S_{pq}^{syn}(\Delta))^2 \quad (3)$$

in which expression (3) p, q, $\Delta$ have already been defined and "ref" and "syn" correspond to two reference and synthesis pictures, respectively;

(iii) the growth is interrupted when the radius R(t) reaches a predetermined value, for example twice the size of the picture.

As regards step (c) the picture is subdivided in the present case into blocks having a size of 8×8 pixels. The step (d) is realised by extracting a dictionary constituted by blocks of the same size (here 8×8) from the sample, for example by taking all the 8×8 blocks in the sample, or if a considerably longer computation time is accepted, by applying a method based on an algorithm of the LBG type. The object of this algorithm studied, for example by Linde, Buzo, Gray in the document "An algorithm for vector quantizer design", IEEE Trans. Commun. vol. COM-28, January 1980, pp. 84–95 is to constitute a dictionary which is better adapted to a possible coding of the texture and to particularly ensure a smoothing of the statistical fluctuations present in the sample.

In the step (e) each block of the approximate synthesis picture is replaced by the closest block of the dictionary, for example in the sense of a distance criterion such as the minimization of the quadratic distance given by the expression (4):

$$Dist = \sum_{x,y}(I^{dict}(x,y) - I(x,y))^2 \quad (4)$$

in which x, y are the coordinates of the pixels (the sum is effected on all the pixels of the block) and I and $I^{dict}$ indicate the luminosity of the pixel of the approximate synthesis picture and that of the corresponding pixel in the dictionary. When all the substitutions have been accomplished., a synthesis picture obtained in conformity with the method described is available.

Figure 2:
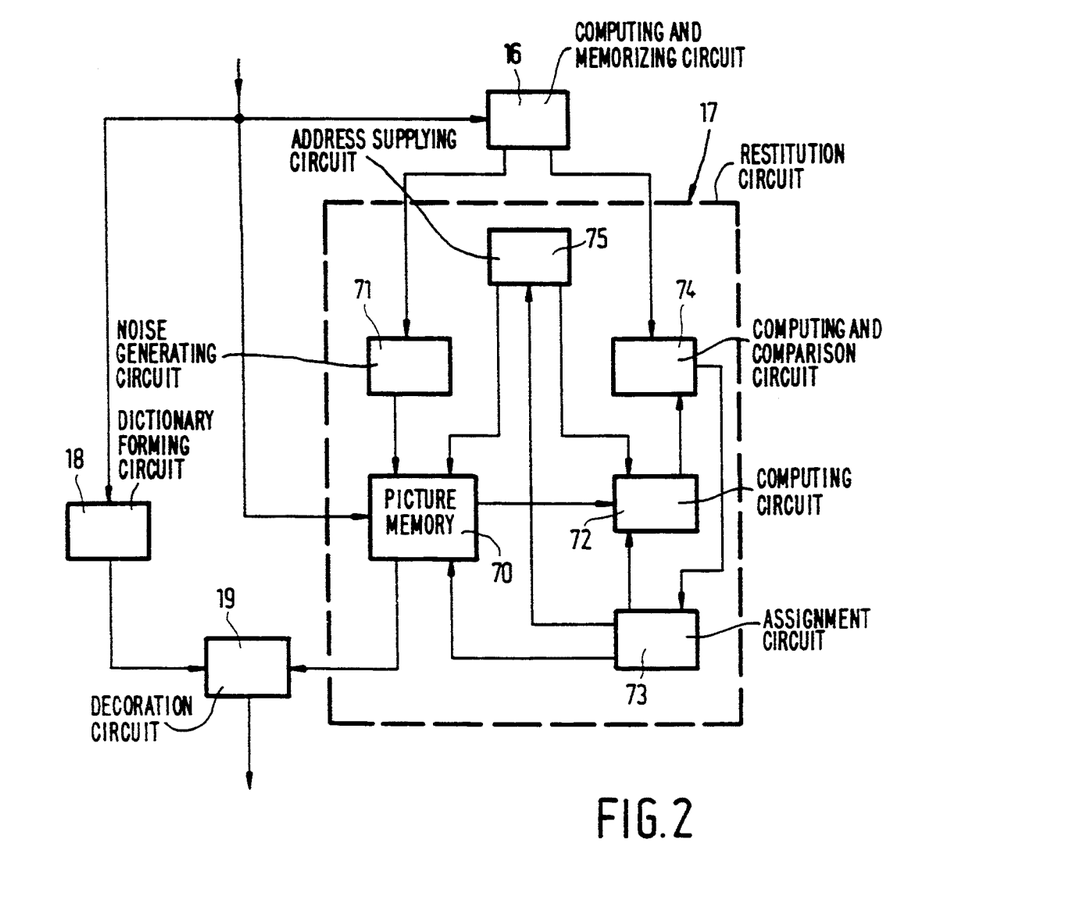
FIG. 2 shows an embodiment of the texture synthesis device according to the invention.

As is shown in FIG. 2, an embodiment of the texture synthesis device for carrying out this method comprises a circuit 16 for computing and memorizing the second-order moments in a number proportional to the desired resolution for the examined synthesis picture. This circuit 16 receives at its input, which is also that of the input of the device, the digital signals corresponding to the luminosity of the pixels constituting the texture sample. First, the average value $I_m$, the standard distance s and the 1-pixel histogram are derived from these luminosities X(x,y) in accordance with the three following respective expressions (5, 6, 7) ($n_i$ being the number of appearances of the grey level $L_i$ among the n sample pixels):

$$I_m = \sum_n X(x,y)/n \quad (5)$$

$$S = \frac{1}{n} \sqrt{\sum_n (X(x,y) - I_m)^2} \quad (6)$$

$$P(X_i = L_i) = n_i/n \quad (7)$$

The moments are thus computed and applied to a circuit 17 for restituting a first approximate synthesis picture in a predetermined growth zone (as has been apparent from the foregoing), a zone which is equal to twice the size of the examined picture has been chosen in this case).

The restitution circuit 17 itself comprises a picture memory 70, a first input of which receives, similarly as the circuit 16, the digital signals constituting the texture sample. The circuit 17 also comprises a circuit 71 for generating noise, whose output is connected to the memory 70, while the noise thus generated has the histogram of the texture to be synthesized (the circuit 71 has a connection from the computing and memorizing circuit 16 in which said one-pixel histogram has been determined): before the reference texture sample is present in the centre, the whole memory 70 is initially filled with a white noise, i.e. all its levels are without any correlation although they are distributed in accordance with probabilites corresponding to the distribution of the grey levels in the reference texture sample. A circuit 72 then computes the statistical moments of the second order relating to the picture during synthesis in the memory 70 (for a subsequent comparison with the similar moments computed for the original picture by the circuit 16).

For this progressive synthesis in the memory 70, pixel addresses are successively chosen in the growth zone desired around the centre of the initial picture constituted by the sample. At each current pixel thus chosen an assignment circuit 73 successively assigns one of the L possible values of the grey level. All the L values are tested in a sequence and at the start of the L tests the one (denoted, for example by $L_{min}$) which contributes to the most favourable computing error (the computing operation being carried out as described hereinafter) is retained so as to be finally assigned to the current pixel. This value as well as the corresponding error are preserved. The error is computed by a computing and comparison circuit 74 which receives the statistical moments of the original texture (computed and provided by the circuit 16 as described hereinbefore) and the statistical moments relating to the texture during synthesis (computed and provided by the circuit 72) and which, based on these magnitudes, computes, for example the quadratic distance between these moments: in the case of this example it is the value $L_{min}$ which contributes to the minimum distance at the output of the circuit 74 which is preserved.

The restitution circuit 17 comprises a circuit 75 for supplying the address, whose function is to produce the current pixel address for which the L tests have been carried out and the selection of $L_{min}$. If (x,y) is the address of a pixel (to be situated in a crown progressively growing around the initial centre constituted by the sample), the probability of this address being taken is given by the expression (2) given hereinbefore. As is shown in FIG. 2, this circuit 75 receives the control signal from the assignment circuit 73 for taking a new pixel address and supplies this new address to the picture memory 70 as well as to the circuit 72 for computing the statistical moments.

This restitution circuit 17 operates as follows. The circuit 71 generates a white noise in the memory 70 and subsequently the sample is placed in the centre of this memory. The circuit 75 then supplies the first address of the current pixel and the circuit 73 assigns a first grey level value to this pixel. The circuit 72 computes the statistical moments for the picture during synthesis and the circuit 74 computes the quadratic distance, based on these statistical moments and on the similar moments associated with the original texture. The minimum distance and the value L corresponding thereto are preserved in the circuit 73 before this circuit assigns another grey level value to the current pixel. If the computed new distance is less than that registered in the circuit 73, it is preserved instead, as well as the value $L_{min}$ of the corresponding grey level, and so forth until all the possible grey level values have been tested. The grey level value $L_{min}$, to which the minimum distance has corresponded, is thus definitively assigned to this pixel and the procedure described hereinbefore is repeated for another pixel address until the complete predetermined growth zone has led to such a definitive assignment for each pixel.

The digital signals constituting the texture sample are also applied to a circuit 18 for constituting the dictionary which, in the present case forms a dictionary of blocks by taking, for example, all the blocks within the sample and by indexing them by means of the corresponding translation. The translation information is given, for example by the position of the pixel situated at the top and left of the block with respect to that of the pixel situated at the top and left of the sample. As has been described hereinbefore, the dictionary may be formed in other manners, and notably by means of the method described hereinbefore. A circuit 19 referred to as decoration circuit then receives the output signal. of the restitution circuit 17 (constituted by the output of the picture memory 70) and of the circuit 18 for forming the dictionary and, as indicated hereinbefore in step (e), replaces each approximate synthesis picture block by the corresponding block of the dictionary in the sense of the criterion used (criterion of minimization of the quadratic distance in the embodiment described hereinbefore). The output of the circuit 19 constitutes the texture synthesis picture supplied by the device according to the invention.

It should be noted that the present invention is not limited to the embodiments described, but modifications may be proposed without passing beyond the scope of the invention..

Figure 3:
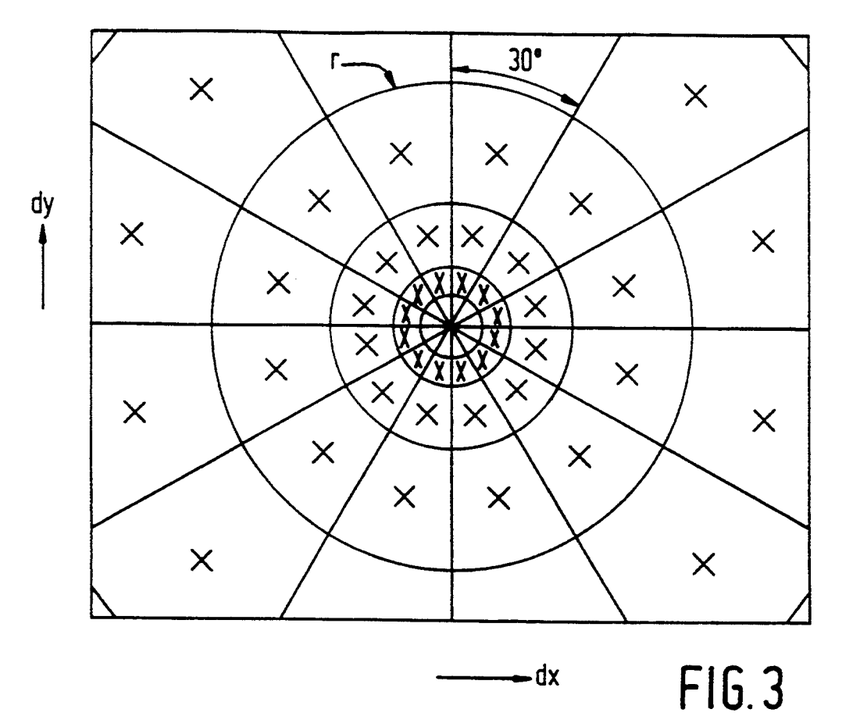
FIG. 3 shows at the ends of a regrouping of the values of second-order moments a possible division of the plane of translation used for indexing the relative position of the two pixels.

The texture synthesis method carried out in the synthesis device according to the invention may particularly be improved in the following way. The structural characteristics memorized in step (a) of said synthesis method may be replaced, for example, by associated values. In the previous example the coefficients expressing the second-order moments may be regrouped to resemble those which correspond to a given direction and to a given module of the vector Δ and to realise, for example the average. A new coefficient then replaces this regrouping and is indexed by the central value given for the module for this regrouping. FIG. 3 shows in the plane ($d_x$, $d_y$) of the coordinates of the vector Δ a possible regrouping example, with a division of the plane of the vectors Δ into sectors bounded by circles centred on the zero point of the module and increasing radii r (for example in accordance with a power of 2, with r=1, 2, 4, 8, ...) and by straight lines originating from the zero point of the module and succeeding each other with constant angles (of, for example 30°): the moments $S_{pq}$ of each sector are regrouped, their average is effected and the new coefficient which substitutes all of them constitutes a value which remains associated with them and is indexed at the central position indicated by a cross. The modification thus described provides the possibility of reducing the number of coefficients to be treated in order of magnitude determined by the ratio of their original number and the logarithm of this number, which leads to considerably shorter computing periods.

A further improvement of the synthesis method in accordance with steps (a) to (e) may be obtained by either repeating, after the steps (d) and (e) at least one second series of steps (d') and (e') which are identical to (d) and (e), respectively, but are realised with blocks of a different size (preferably a size which is incommensurable with the previous size, for example 5×5 instead of 8×8) or by carrying out a new synthesis step with the coefficients $S_{pq}$. These two variants yield an improvement of the reproduction of the texture by elimination of the effects of residual blocks.

It should be noted that these variants may be used in the embodiment of the above-described device according to the invention which comprises the elements 16 to 19. Particularly, the computing and memorizing circuit 16 may also include the regrouping of second-order moments in sectors (diagrammatically shown in FIG. 3) and their substitution by their average value or a value having a comparable significance and which is directly associated thereto. On the other hand the device according to the invention may be provided, for example in the computing and memorizing circuit 16 or in the circuits 18 and 19 for constituting the dictionary and for decoration, respectively with feedback means with which an approximate synthesis step can be repeated once or several times with the coefficients $S_{pq}$ or the steps (d') and (e') identical to the steps (d) and (e) but realised with blocks having a size differing from that chosen the first time (here again, sizes which are preferably first).

The invention may be used in a particularly interesting way by including the synthesis method as described hereinbefore in a method of transmitting and/or storing texture signals. More specifically, such a method may be used for coding pictures comprising textures. In fact, a texture is understood to be a region of a picture which, without necessarily being uniform, is relatively homogeneous as regards its aspect (it is often a surface constituted by the same material: wood, fabrics, tiles, etc ...) and thus comprises a limited number of patterns which are more or less frequently repeated in accordance with a given arrangement which may be either regular or random. It is thus feasible to benefit from the redundancy associated with a repetition of patterns for compressing the information contained in the picture with a view to their transmission and/or their storage and subsequent restitution.

It is known that in the case of pictures comprising different textures to carry out a preliminary segmentation in homogeneous texture regions (see, for example the communication "Unsupervised segmentation of textured images" by X. Michel, R. Leonardi and A. Gersho, SPIE vol. 1001, Visual Communication and Image Processing 88, pp. 582–590). In the following description it will be assumed that this segmentation is effected and that one of these homogeneous regions is available, but which may not be necessarily connected. A synthesis method and device according to the invention are now shown while considering said region and the generalization in the case of the picture comprising different textures will conclude the description.

It is thus assumed that all the information characterizing the texture of this homogeneous region is contained in one sample (of the size w×h) directly extracted from said region. The method of transmitting and/or storing texture signals in conformity with the invention comprises the following steps:

(A) extraction of a sample which is representative of the texture considered, for example by taking the sample substantially in the centre of the region;

(B) coding of this sample;

(C) transmission of the coded signals (and/or storage of these signals, dependent on the application considered);

(D) decoding the coded signals corresponding to the sample;

(E) synthesis of texture in the whole region constituting said predetermined growth zone in the aforementioned step (b).

An embodiment of the device for transmitting and/or storing texture signals for carrying out such a method, including at least one texture synthesis device as described hereinbefore is also within the scope of the present invention. This device, shown in FIG. 4, comprises a circuit 11 for extracting a sample in each homogeneous texture region and a circuit 12 for coding the signals corresponding to the sample thus extracted and, after transmission and/or storage of the coded signals by means denoted by the reference numeral 14 in the Figure (for example, transmission or video channel), a circuit 15 for decoding the coded signals which have been transmitted and/or stored and a device 160 for texture synthesis based on the decoded output signals of the circuit 15. This texture synthesis device 160, which comprises the elements 16 to 19 described hereinbefore, is not shown again in detail in FIG. 4.

Figure 4:
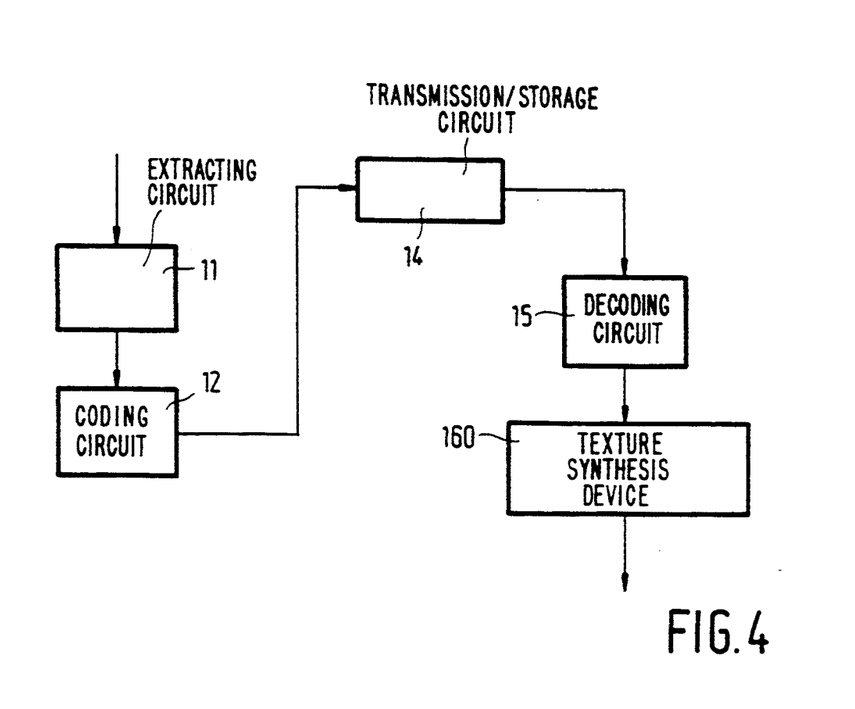
FIGS. 4 and 5 show embodiments of a device and a system, respectively, for transmitting and/or storing texture signals, comprising at least one texture synthesis device according to the: invention.

It will be, evident that the circuits 11 to 15 may be provided particularly for an adequate feedback to ensure the extraction of several samples corresponding to as many textures and thus homogeneous regions of the picture, to code the signals corresponding to each sample, to transmit and/or store the signals and subsequently to decode the coded signals thus transmitted and/or stored, while the synthesis of the texture following this decoding operation can be ensured either by a single device reactivated for each group of decoded signals corresponding to each original sample, or by several synthesis devices arranged in parallel and each receiving the group of decoded signals corresponding to a single original sample.

Figure 5:
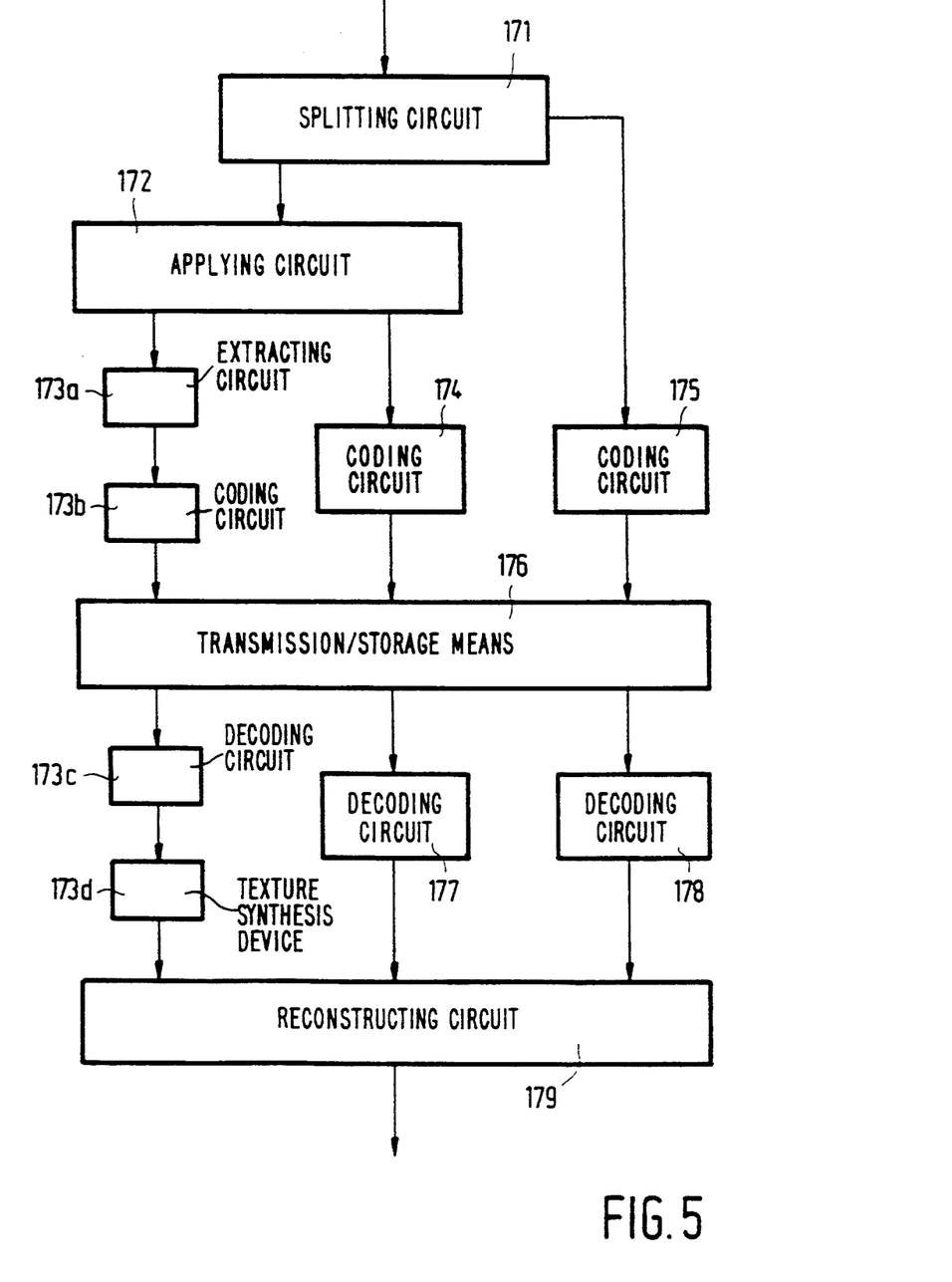

FIG. 5 shows an embodiment of a system for transmitting and/or storing texture signals relating to pictures. This system, which ensures an effective compression of dam, comprises a circuit 171 for splitting the current picture into two sub-pictures, the first of which comprises the textured parts of said picture and the second comprises the non-textured parts. The second sub-picture may be obtained, for example, by means of a low-pass filter and the first sub-picture is derived therefrom by taking the difference with the picture before the split-up, which filtering and subtracting operations are carried out by the circuit 171.

The textured sub-picture is applied to a segmentation circuit 172 which segments this sub-picture into homogeneous texture regions (for example, in accordance with the method described in the afore-mentioned communication by X. Michel, R. Leonardi and A. Gersho) and this circuit 172 applies the different textures thus constituted to a texture synthesis device which is similar to that described hereinbefore with reference to FIG. 4. Such a device comprises a circuit 173a for extracting samples (as many samples as textures formed after segmentation), a circuit 173b for coding the signals corresponding to each extracted sample, means for transmitting and/or storing the coded signals, a circuit 173c for decoding the coded signals (corresponding to each sample) which have been transmitted and/or stored, and a texture synthesis device 173d as defined hereinbefore and carrying out the same operations (computation and memorization of structural characteristics, restitution of approximate synthesis pictures, constitution of dictionaries, final decoration).

The segmentation circuit 172 also applies the contours of homogeneous texture regions to a circuit 174 for coding contours. This circuit 174 codes these different contours, for example in accordance with the method described in the thesis by R. Leonardi, Ecole Polytechnique de Lausanne, Switzerland, no. 691, 1987 and the signals thus coded are applied to transmission and/or storage means. Finally, a circuit 175 for coding the non-textured sub-picture, received directly from the separation circuit 171 supplies a third group of coded signals to transmission and/or storage means. These means which are present at the output of circuits 173b, 174 and 175 are regrouped in the Figure in a single representation denoted by the reference numeral 176.

Having thus transmitted and/or stored the various coded signals applied thereto, these means 176 supply in a corresponding manner signals to be decoded which on the one hand are texture signals applied to the decoding circuit 173c as described hereinbefore and on the other hand texture contour signals applied to a circuit 177 for decoding the contours coded by the circuit 174, and finally the signals of the non-textured sub-picture applied to a circuit 178 for decoding the non-textured sub-picture coded by the circuit 175. The textures synthesized at the output of the device 173d, the contours restituted by the circuit 177 and the sub-picture reconstituted at the output of the circuit 178 are subsequently applied to a circuit 179 for reconstructing the final picture, which circuit performs the operations inversely to those performed by the separation and segmentation circuits 171 and 172, respectively, and supplies a final picture corresponding to the current picture received at the input of said circuit 171.

Referring; to FIGS. 4 and 5, it will also be noted that an even greater compression of data is obtained if, before their transmission, the sample or samples (at the output of circuit 11 in FIG. 4 or circuit 173a in FIG. 5, respectively) are treated in accordance with a compression technique successively making use of a discrete cosine transform (DCT), a quantization of coefficients resulting from this transform and a variable-length coding (VLC) of the quantized values.

We claim:

1. A method for texture synthesis based on digital video signals which are associated with sample blocks of pixels constituting a reference sample, said method comprising the steps of:
   a) ascertaining and storing a plurality of sample values representing structural characteristics of, or associated with, said reference sample;
   b) forming an approximate synthesis picture by progressive growth based upon said sample values and said reference sample;
   c) subdividing said approximate synthesis picture into a plurality of approximate pixel blocks each having an identical size;
   d) creating a dictionary for storing those sample blocks of said reference sample which have the same size as said approximate pixel blocks; and
   e) forming a definitive synthesis picture by substituting, as a function of a predetermined criterion, each of said approximate pixel blocks for a sample block stored in said dictionary.

2. A method for transmitting or storing and synthesizing texture signals comprising the steps of:
   a) deriving from an image signal, a group of sample blocks of pixels constituting a reference sample of texture in said image signal;
   b) coding said reference sample into digital video signals;
   c) transmitting or storing said digital video signals;
   d) decoding said digital video signals to derive said reference sample;
   e) ascertaining and storing a plurality of sample values representing structural characteristics of, or associated with, said reference sample;
   f) forming an approximate synthesis picture by progressive growth based upon said sample values and said reference sample;
   g) subdividing said approximate synthesis picture into a plurality of approximate pixel blocks each having an identical size;
   h) creating a dictionary for storing those sample blocks of said reference sample which have the same size as said approximate pixel blocks; and
   i) forming a definitive synthesis picture by substituting, as a function of a predetermined criterion, each of said approximate pixel blocks for a sample block stored in said dictionary.

3. A device for texture synthesis based on digital video signals, characterized in that said clevice comprises:
   (a) based on those signals which are associated with a group of pixels constituting a sample referred to as reference sample, a circuit (16) for computing and memorizing structural characteristics of said sample or of values directly associated therewith;
   (b) based on structural characteristics thus computed and on digital signals corresponding to said reference sample, a circuit (17) for restituting an approximate synthesis picture by progressive growth in a predetermined region, said approximate synthesis picture being subdivided into pixel blocks having an identical size;
   (c) based on blocks considered in said reference sample and having the same size as those of the, approximate synthesis picture, a circuit (18) for constituting a dictionary;
   (d) based on output signals of said circuit for constituting the dictionary, a circuit (19) for decorating said approximate synthesis picture by substituting a block of said dictionary for each approximate synthesis picture block.

4. A device as claimed in claim 3, characterized in that said structural characteristics are the statistical moments of the second order, while the number of computed moments is fixed as a function of the desired resolution for said definitive synthesis picture.

5. A device as claimed in claim 4, characterized in that the values of the moments are regrouped in sectors of the plane of coordinates of the pixels of the sample and substituted for a unique value such as the average value of said moments.

6. A device as claimed in claim 4, characterized in that said restitution circuit (17) comprises:
   (a) a circuit (71) for generating white noise having the histogram of the texture to be synthesized and as defined by the computing and memorizing circuit (16);
   (b) a picture memory (70) receiving, at a first input, said digital signals corresponding to the reference sample and, at a second input, the output signal of said circuit (71) for generating the white noise;
   (c) a circuit (75) for providing the address of the current pixel, said address being received by the picture memory (70) at a third input;
   (d) a circuit (73) for successively assigning to each pixel thus chosen each one of the L possible grey level values;
   (e) a circuit (72) for computing, for each tested grey level, the statistical moments of the second order relative to the picture during synthesis in the picture memory (70);
   (f) a circuit (74) for computing, for each one of said L grey level values, the quadratic distance between said statistical moments relative to the picture during synthesis and the similar moments as defined for the original texture by the computing and memorizing circuit (16), while the smallest of the computed distances is preserved in the assigning circuit (73), as well as the corresponding grey value for transmission of said value to the picture memory (70) at a fourth input of said memory.

7. A device as claimed in claim 3, characterized in that the computing and memorizing circuit (16) and/or the circuits (18, 19) for constituting the dictionary and for decoration are provided with feedback means which allow the corresponding steps of computing and memorizing the structural characteristics and/or for constituting the dictionary and for decoration to be restarted once or several times, with blocks each time having a different size.

8. A device for transmitting and/or storing texture signals, which device comprises at least a texture synthesis device (160) as claimed in claim 3, characterized in that it comprises, upstream of said synthesis device, a circuit (11) for extracting the sample, a circuit (12) for coding the signals corresponding to said extracted sample, means (14) for transmitting and/or storing the coded signals, and a circuit (15) for decoding the coded signals which have been transmitted and/or stored.

9. A system for transmitting and/or storing texture signals associated with pictures, said system comprising at least a texture synthesis device as claimed in claim 3, characterized in that it also comprises:

(1) a circuit (171) for separating the current input picture into two sub-pictures, one comprising the texturized parts of said picture and the other comprising the non-texturized parts;

(2) a circuit (172) for segmenting said texturized sub-picture into regions which are homogeneous in texture but which may not be connected, whose output signals are applied to said texture synthesis device;

(3) a circuit (174) for coding the contours of said regions which are homogeneous in texture and a circuit (175) for coding the non-texturized sub-picture, as well as, after transmission and/or storage, a circuit (177) for decoding said contours and a circuit (178) for decoding the signals of the non-texturized sub-picture;

(4) a circuit (179) for reconstructing a final picture corresponding to said current input picture from output signals of said decoding circuits (177, 178) and said texture synthesis device.

10. A system as claimed in claim 9, characterized in that said separating circuit (171) comprises a low-pass filter for supplying said non-texturized sub-picture and a subtracter for supplying said texturized sub-picture by taking the difference between the current input picture and the non-texturized sub-picture.

11. A device as claimed in claim 5, characterized in that said restitution circuit comprises:

(a) a circuit for generating white noise having the histogram of the texture to be synthesized and as defined by the computing and memorizing circuit;

(b) a picture memory receiving, at a first input, said digital signals corresponding to the reference sample and, at a second input, the output signal of said circuit for generating the white noise;

(c) a circuit for providing the address of the current pixel, said address being received by the picture memory at a third input;

(d) a circuit for successively assigning to each pixel thus chosen each one of the L possible grey level values;

(e) a circuit for computing, for each tested grey level, the statistical moments of the second order relative to the picture during synthesis in the picture memory;

(f) a circuit for computing, for each one of said L grey level values, the quadratic distance between said statistical moments relative to the picture during synthesis and the similar moments as defined for the original texture by the computing and memorizing circuit, while the smallest of the computed distances is preserved in the assigning circuit, as well as the corresponding grey value for transmission of said value to the picture memory at a fourth input of said memory.

12. A device as claimed in claim 4, characterized in that the computing and memorizing circuit and/or the circuits for constituting the dictionary and for decoration are provided with feedback means which allow the corresponding steps of computing and memorizing the structural characteristics and/or for constituting the dictionary and for decoration and for decoration to be restarted once or several times, with blocks each time having a different size.

13. A device as claimed in claim 5, characterized in that the computing and memorizing circuit and/or the circuits for constituting the dictionary and for decoration are provided with feedback means which allow the corresponding steps of computing and memorizing the structural characteristics and/or for constituting the dictionary and for decoration and for decoration to be restarted once or several times, with blocks each time having a different size.

14. A device as claimed in claim 6, characterized in that the computing and memorizing circuit and/or the circuits for constituting the dictionary and for decoration are provided with feedback means which allow the corresponding steps of computing and memorizing the structural characteristics and/or for constituting the dictionary and for decoration and for decoration to be restarted once or several times, with blocks each time having a different size.

15. A device for transmitting and/or storing texture signals, which device comprises at least a texture synthesis device as claimed in claim 4, characterized in that it comprises, upstream of said synthesis device, a circuit for extracting the sample, a circuit for coding the signals corresponding to said extracted sample, means for transmitting and/or storing the coded signals, and a circuit for decoding the coded signals which have been transmitted and/or stored.

16. A device for transmitting and/or storing texture signals, which device comprises at least a texture synthesis device as claimed in claim 5, characterized in that it comprises, upstream of said synthesis device, a circuit for extracting the sample, a circuit for coding the signals corresponding to said extracted sample, means for transmitting and/or storing the coded signals, and a circuit for decoding the coded signals which have been transmitted and/or stored.

17. A device for transmitting and/or storing texture signals, which device comprises at least a texture synthesis device as claimed in claim 7, characterized in that it comprises, upstream of said synthesis device, a circuit for extracting the sample, a circuit for coding the signals corresponding to said extracted sample, means for transmitting and/or storing the coded signals, and a circuit for decoding the coded signals which have been transmitted and/or stored.

18. A system for transmitting and/or storing texture signals associated with pictures, said system comprising at least a texture synthesis device as claimed in claim 4, characterized in that it also comprises:
- (1) a circuit for separating the current input picture into two sub-pictures, one comprising the texturized parts of said picture and the other comprising the non-texturized parts;
- (2) a circuit for segmenting said texturized sub-picture into regions which are homogeneous in texture but which may not be connected, whose output signals are applied to said texture synthesis device;
- (3) a circuit for coding the contours of said regions which are homogeneous in texture and a circuit for coding the non-texturized sub-picture, as well as, after transmission and/or storage, a circuit for decoding said contours and a circuit for decoding the signals of the non-texturized sub-picture;
- (4) a circuit for reconstructing a final picture corresponding to said current input picture from output signals of said decoding circuits and said texture synthesis device.

19. A system for transmitting and/or storing texture signals associated with pictures, said system comprising at least a texture synthesis device as claimed in claim 5, characterized in that it also comprises:
- (1) a circuit for separating the current input picture into two sub-pictures, one comprising the texturized parts of said picture and the other comprising the non-texturized parts;
- (2) a circuit for segmenting said texturized sub-picture into regions which are homogeneous in texture but which may not be connected, whose output signals are applied to said texture synthesis device;
- (3) a circuit for coding the contours of said regions which are homogeneous in texture and a circuit for coding the non-texturized sub-picture, as well as, after transmission and/or storage, a circuit for decoding said contours and a circuit for decoding the signals of the non-texturized sub-picture;
- (4) a circuit for reconstructing a final picture corresponding to said current input picture from output signals of said decoding circuits and said texture synthesis device.

20. A system for transmitting and/or storing texture signals associated with pictures, said system comprising at least a texture synthesis device as claimed in claim 7, characterized in that it also comprises:
- (1) a circuit for separating the current input picture into two sub-pictures, one comprising the texturized parts of said picture and the other comprising the non-texturized parts;
- (2) a circuit for segmenting said texturized sub-picture into regions which are homogeneous in texture but which may not be connected, whose output signals are applied to said texture synthesis device;
- (3) a circuit for coding the contours of said regions which are homogeneous in texture and a circuit for coding the non-texturized sub-picture, as well as, after transmission and/or storage, a circuit for decoding said contours and a circuit for decoding the signals of the non-texturized sub-picture;
- (4) a circuit for reconstructing a final picture corresponding to said current input picture from output signals of said decoding circuits and said texture synthesis device.

* * * * *